(12) United States Patent
Brooks et al.

(10) Patent No.: US 10,317,954 B2
(45) Date of Patent: Jun. 11, 2019

(54) ELECTROACOUSTIC DEVICES FOR A COMPUTING DEVICE

(71) Applicant: HEWLETT-PACKARD DEVELOPMENT COMPANY, L.P., Houston, TX (US)

(72) Inventors: Robert C. Brooks, Houston, TX (US); Ann Alejandro Villegas, Houston, TX (US); Charlie Ku, Taipei (TW)

(73) Assignee: Hewett-Packard Development Company, L.P., Spring, TX (US)

( * ) Notice: Subject to any disclaimer, the term of this patent is extended or adjusted under 35 U.S.C. 154(b) by 15 days.

(21) Appl. No.: 15/749,099

(22) PCT Filed: Jan. 11, 2016

(86) PCT No.: PCT/US2016/012802
§ 371 (c)(1),
(2) Date: Jan. 30, 2018

(87) PCT Pub. No.: WO2017/123187
PCT Pub. Date: Jul. 20, 2017

(65) Prior Publication Data
US 2018/0224903 A1  Aug. 9, 2018

(51) Int. Cl.
*G06F 1/16* (2006.01)

(52) U.S. Cl.
CPC .......... *G06F 1/1688* (2013.01); *G06F 1/1616* (2013.01)

(58) Field of Classification Search
CPC .............................. G06F 1/1688; G06F 1/1616
USPC ......................................................... 381/388
See application file for complete search history.

(56) References Cited

U.S. PATENT DOCUMENTS

| | | | |
|---|---|---|---|
| 5,838,537 A | 11/1998 | Lundgren et al. | |
| 6,151,401 A * | 11/2000 | Annaratone | G06F 1/1616 361/679.23 |
| 6,181,550 B1 * | 1/2001 | Kim | G06F 1/1616 361/679.06 |
| 6,246,570 B1 * | 6/2001 | Kim | G06F 1/1616 361/679.23 |
| 7,453,440 B2 | 11/2008 | Sun | |
| 2005/0248911 A1 | 11/2005 | Suprapmo et al. | |
| 2006/0084468 A1 * | 4/2006 | Kim | H04M 1/0214 455/550.1 |
| 2009/0156263 A1 | 6/2009 | Park et al. | |
| 2011/0129109 A1 * | 6/2011 | Okutsu | H04R 1/025 381/332 |
| 2011/0222720 A1 | 9/2011 | Cheng et al. | |
| 2011/0235847 A1 | 9/2011 | Bhutani et al. | |

(Continued)

FOREIGN PATENT DOCUMENTS

WO  WO-2014101033 A1  7/2014

*Primary Examiner* — Sean H Nguyen
(74) *Attorney, Agent, or Firm* — HPI Patent Department

(57) ABSTRACT

Examples disclosed herein provide electroacoustic devices of a computing device. An example computing device includes a base member and a display member rotatably connected to the base member via a hinge. The display member is to cover a top surface of the base member when the device is in a closed position. The computing device includes an electroacoustic device residing within a cavity along the top surface of the base member. As an example, when the display member is to be opened from the closed position of the device, the electroacoustic device is to rotate out from the cavity.

15 Claims, 2 Drawing Sheets

(56) References Cited

U.S. PATENT DOCUMENTS

2013/0170124 A1 7/2013 Pan et al.
2014/0341418 A1 11/2014 Kwong et al.

* cited by examiner

ELECTROACOUSTIC DEVICES FOR A COMPUTING DEVICE

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

DETAILED DESCRIPTION

Many form factors exist for notebook computers. A common form factor includes hinges that connect the two members of the clamshell-type design at the common end. A challenge faced by manufacturers of a notebook computer is in the placement of electroacoustic devices, or speakers, that generate audio for the notebook computer. Various factors may be taken into consideration when determining the placement of electroacoustic devices in a notebook computer.

Examples disclosed herein provide for the placement of electroacoustic devices in a device, such as a notebook computer, that allow for the electroacoustic devices to be directed towards a user of the device when the device is in use. As will be further described, the electroacoustic devices may be directed towards the user by ejecting or rotating out from a cavity of a base member of the device as the display member of the device is opened. By causing for the electroacoustic devices to be directed towards the user, audio generated by the electroacoustic devices may be directed towards the user, providing for a richer sound and more immersive user experience.

Figure 1A:
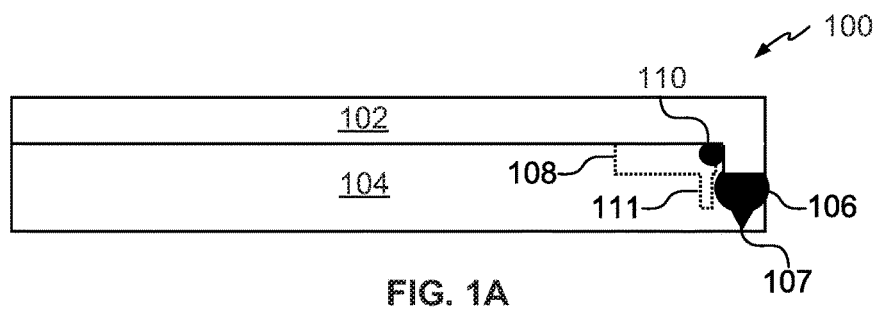
FIGS. 1A-B illustrate a computing device, such as a notebook computer, according to an example.
Figure 1B:
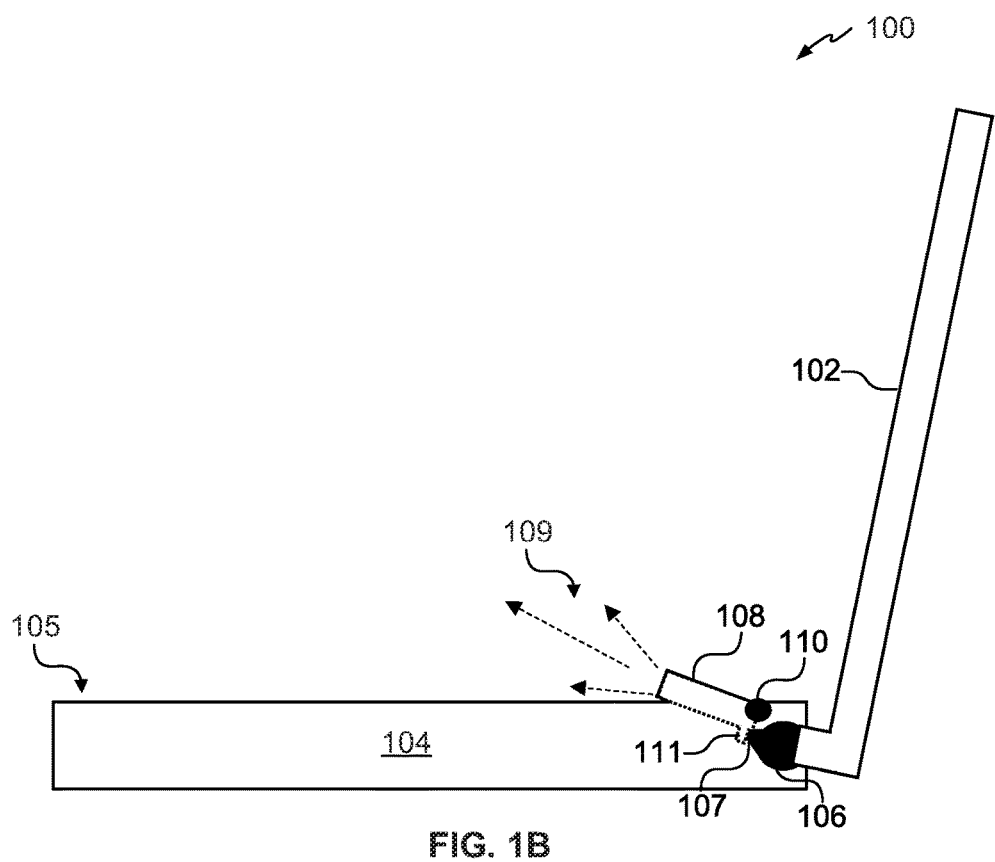

With reference to the figures, FIGS. 1A-B illustrate a computing device 100, such as a notebook computer, according to an example. The computing device 100 includes a base member 104 and a display member 102 that may be joined together via a hinge 106. As an example, the base member 104 includes an area for user input, such as a touchpad and a keyboard. The display member 102 includes a display screen for viewing the video output of the computing device 100, and may include input means for operation by a user, such as a touchscreen (e.g., the display screen may be the touchscreen). FIG. 1A illustrates the computing device 100 in a closed position, and FIG. 1B illustrates the computing device 100 in an opened position. As illustrated, when the computing device 100 is in a closed position, the display member 102 is to cover a top surface 105 of the base member 104.

As mentioned above, various factors may be taken into consideration when determining the placement of electroacoustic devices in the computing device 100. As an example, it may be desirable to avoid interference with microphones of the computing device 100 when determining the placement of the electroacoustic devices. It may not be desirable for the electroacoustic devices to be in an area of the computing device 100 that may interfere with the output of the electroacoustic devices, for example, in a palm rest area of the computing device 100. In addition, the directionality of the audio generated by the electroacoustic devices, for example, whether the audio is being directed towards a user of the device 100, may be taken into consideration in order to ensure that the user is provided with richer sound and a more immersive user experience. For example, if the electroacoustic devices are disposed flat along the top surface 105 of the base member, audio generated by the electroacoustic devices may fire upward, and not towards the user of the device 100.

Referring to FIGS. 1A-B, the computing device 100 includes an electroacoustic device 108, or speaker, that generates audio for the computing device 100. As illustrated, the electroacoustic device 108 resides within a cavity along the top surface 105 of the base member 104. The number of electroacoustic devices 108 included in the computing device 100 may vary.

As illustrated in FIG. 1B, when the display member 102 is to be opened from the closed position of the device 100 illustrated in FIG. 1A, the electroacoustic device 108 is to eject, pop out, or rotate out from the cavity. Upon rotating out from the cavity, audio generated by the electroacoustic device 108 (indicated by arrow 109) may be directed towards a user of the device 100, providing richer sound and a more immersive user experience, for example, compared to if the audio generated was being directed directly upwards from the base member 104.

Referring back to FIG. 1A, when the display member 102 is to be closed to cover the top surface 105 of the base member 104, the electroacoustic device 108 may retract back within the cavity of the base member 104. As an example, the electroacoustic device 108 is rotatably connected to the base member 104 via a hinge 110, in order to rotate out from the cavity and retract within the cavity. However, the electroacoustic device 108 may pop out or eject from the cavity via other mechanisms besides the hinge 110, when the display member 102 is opened and closed.

As an example, the electroacoustic device 108 may be synchronized to automatically eject from the cavity as the display member 102 is opened, and to automatically retract back within the cavity as the display member 102 is closed, without requiring any additional touch or action. The mechanism for providing this synchronization may vary. For example, synchronization of the movement of the electroacoustic device 108 based on movement of the display member 102 may be accomplished by utilizing a combination of springs, magnets, gears, and various other mechanical components. Electrical mechanism may also be used to initiate movement of the electroacoustic device 108, for example, when it is detected that the display member 102 is opened or closed.

As an example, the electroacoustic device 108 may be spring loaded in order to rotate out from the cavity when the display member 102 is to be opened from the closed position of the device 100. Similarly, the force provided as the display member 102 is closed may overcome the tension provided by the spring loading in order for the electroacoustic device 108 to retract back within the cavity. As an example, the hinge 110 of the electroacoustic device 108 may be spring loaded or the electroacoustic device 108 may be spring loaded within the cavity in order to rotate out from the cavity when the display member 102 is to be opened from the closed position of the device 100.

As an example, the hinge 106 of the device 100 may be used to rotate the electroacoustic device 108 out from the cavity when the display member 102 is to be opened from the closed position of the device 100. For example, as the hinge 106 is rotated when the display member 102 is opened, a protruding point 107 of the hinge 106 may come in contact with a jut 111 from the electroacoustic device 108 to rotate the electroacoustic device 108 out from the cavity along the top surface 105 of the base member 104.

Referring to FIG. 1B, when the display member 102 is opened, the hinge 106 may prevent the electroacoustic device 108 from retracting within the cavity. For example, as the protruding point 107 of the hinge 106 is in contact with the jut 111 from the electroacoustic device 108, the electroacoustic device 108 may not be able to retract within the cavity until the display member 102 is closed. When the display member 102 is closed, the protruding point 107 of the hinge 106 may rotate away from the jut 111 of the electroacoustic device 108, allowing for the electroacoustic device 108 to retract back within the cavity as the display member 102 covers the top surface 105 of the base member 104. As mentioned above, gears may be used instead to initiate rotation of the electroacoustic device 108 as the display member 102 is opened or closed.

Figure 2A:
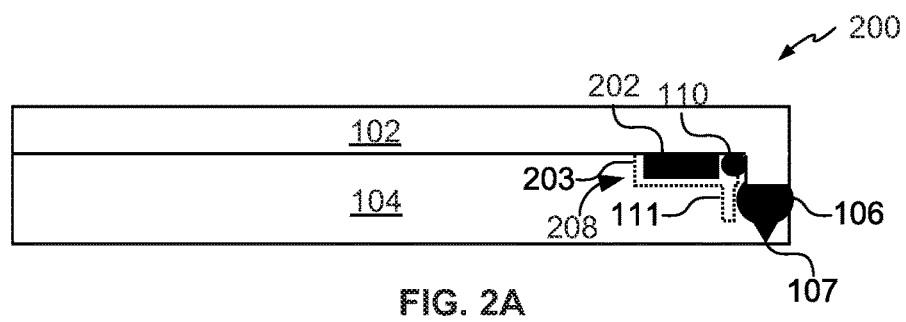
FIGS. 2A-B illustrate a computing device with an extendible electroacoustic device, according to an example.
Figure 2B:
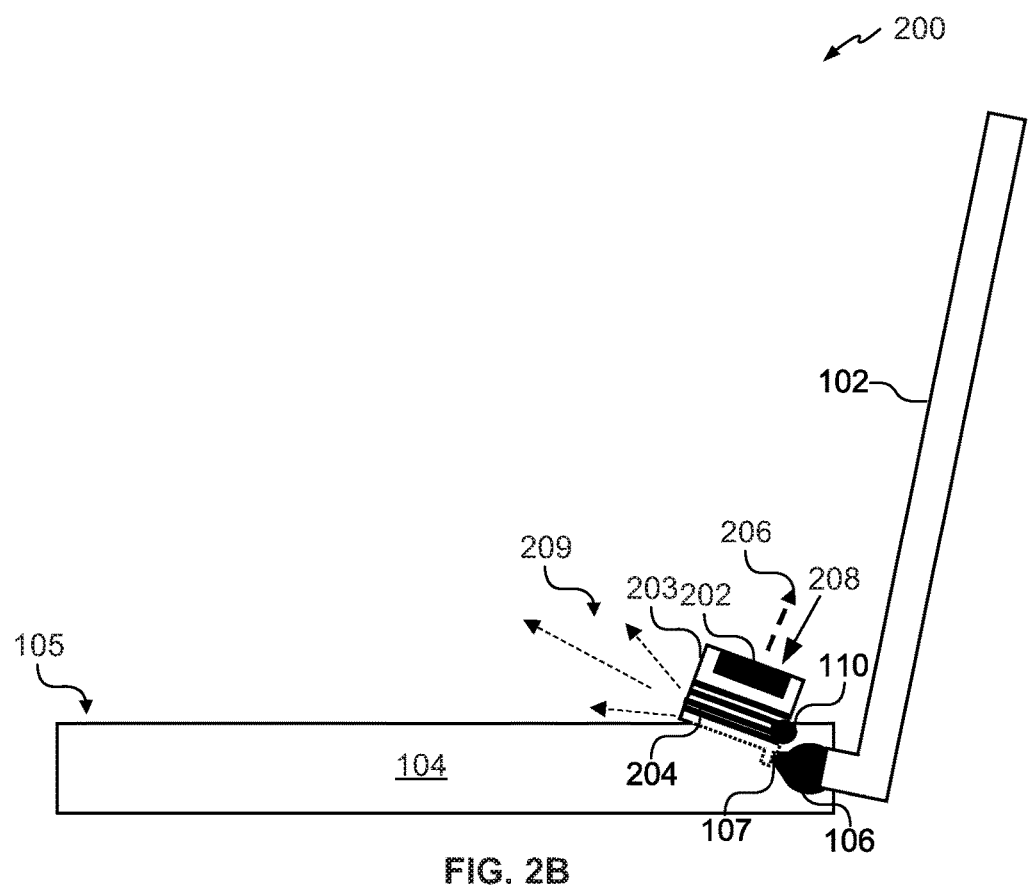

FIGS. 2A-B illustrate a computing device 200 with an extendible electroacoustic device 208, according to an example. As an example, the electroacoustic device 208 generally includes a speaker driver 202 and an enclosure 203 to house the speaker driver 202. As illustrated, the electroacoustic device 208 resides within a cavity along the top surface 105 of the base member 104. The number of electroacoustic devices 108 included in the computing device 200 may vary.

Referring to FIG. 2B, when the display member 102 is to be opened from the closed position of the device 200 illustrated in FIG. 2A, the electroacoustic device 208 is to eject, pop out, or rotate out from the cavity, similar to electroacoustic device 108 in FIGS. 1A-B. In addition to rotating out from the cavity, a height of the electroacoustic device 208 is extendible (indicated by arrow 206) when the electroacoustic device 208 is to rotate out from the cavity. As an example, the enclosure 203 includes flexible materials 204 to extend the height of the enclosure 203 when the electroacoustic device 208 is to eject or rotate out from the cavity. The increase in height may provide an increased physical volume (indicated by arrow 209) when the display member 102 is opened and the device 200 is in use, providing users a richer sound and a more immersive user experience.

Referring back to FIG. 2A, when the display member 102 is to be closed to cover the top surface 105 of the base member 104, the electroacoustic device 208 may retract back within the cavity of the base member 104. In addition, the height of the electroacoustic device 208 may be collapsible in order to fully retract the electroacoustic device 208 within the cavity. By providing an electroacoustic device 208 with an enclosure 203 that is extendible and collapsible, a richer sound may be obtained while the computing device 200 is in use without adding to the Z-height of the computing device 200.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
a base member;
a display member rotatably connected to the base member via a hinge, wherein the display member is to cover a top surface of the base member when the device is in a closed position; and
an electroacoustic device coupled to a flexible material, the electroacoustic device residing within a cavity along the top surface of the base member, wherein when the display member is to be opened from the closed position of the device, the electroacoustic device is to rotate out from the cavity to a first position and wherein
the electroacoustic device, after rotating out of the cavity, is extendable to a second position by extending the flexibly material.

2. The computing device of claim 1, wherein when the electroacoustic device is to rotate out from the cavity, audio generated by the electroacoustic device is to be directed towards a user of the device.

3. The computing device of claim 1, wherein when the display member is to be closed to cover the top surface of the base member, the electroacoustic device is to retract within the cavity.

4. The computing device of claim 3, wherein the electroacoustic device is rotatably connected to the base member in order to rotate out from the cavity and retract within the cavity.

5. The computing device of claim 1, wherein the electroacoustic device is synchronized to move based on opening and closing the display member.

6. The computing device of claim 1, wherein the electroacoustic device is spring loaded in order to rotate out from the cavity when the display member is to be opened from the closed position of the device.

7. The computing device of claim 1, wherein the hinge is to rotate the electroacoustic device out from the cavity when the display member is to be opened from the closed position of the device.

8. The computing device of claim 7, wherein the hinge is to prevent the electroacoustic device from retracting within the cavity when the display member is opened from the closed position of the device.

9. The computing device of claim 1, wherein a height of the electroacoustic device is extendible when the electroacoustic device is to rotate out from the cavity.

10. The computing device of claim 9, wherein the height of the electroacoustic device is collapsible when the electroacoustic device is to retract within the cavity.

11. An electroacoustic device of a computing device, the electroacoustic device comprising:

a driver; and an enclosure to house the driver, wherein the electroacoustic device is coupled to a flexible material and resides within a cavity along a top surface of a base member of the computing device, and wherein when a display member of the computing device rotatably connected to the base member is to be opened, the electroacoustic device is to eject from the cavity to a first position and wherein the electroacoustic device, after ejecting from the cavity, is extendable to a second position by extending the flexible material.

12. The electroacoustic device of claim 11, wherein a height of the enclosure is extendible when the electroacoustic device is to eject from the cavity.

13. The electroacoustic device of claim 12, wherein the height of the enclosure is collapsible when the electroacoustic device is to retract within the cavity.

14. A computing device comprising:

a base member;

a display member rotatably connected to the base member via a hinge, wherein the display member is to cover a top surface of the base member when the device is in a closed position; and an electroacoustic device coupled to a flexible material, the electroacoustic device residing within a cavity along the top surface of the base member, wherein when the display member is to be opened from the closed position of the device, the electroacoustic device is synchronized to automatically rotate out from the cavity to a first position and wherein the electroacoustic device, after rotating out of the cavity, is extendable to a second position by extending the flexible material.

15. The computing device of claim 14, wherein a height of the electroacoustic device is extendible when the electroacoustic device is to rotate out from the cavity.

* * * * *

UNITED STATES PATENT AND TRADEMARK OFFICE
CERTIFICATE OF CORRECTION

PATENT NO. : 10,317,954 B2
APPLICATION NO. : 15/749099
DATED : June 11, 2019
INVENTOR(S) : Robert C. Brooks et al.

It is certified that error appears in the above-identified patent and that said Letters Patent is hereby corrected as shown below:

On the Title Page

In item (73), Assignee, in Column 1, Line 1, delete "Hewett-Packard" and insert
-- Hewlett-Packard --, therefor.

Signed and Sealed this
First Day of October, 2019

Andrei Iancu
*Director of the United States Patent and Trademark Office*